(12) United States Patent
Tokunaga

(10) Patent No.: US 9,636,576 B2
(45) Date of Patent: May 2, 2017

(54) GAMING SYSTEM AND GAMING DEVICE

(71) Applicant: TOMY COMPANY, LTD., Tokyo (JP)

(72) Inventor: Makoto Tokunaga, Nishitokyo (JP)

(73) Assignee: TOMY COMPANY, LTD., Tokyo (JP)

( * ) Notice: Subject to any disclaimer, the term of this patent is extended or adjusted under 35 U.S.C. 154(b) by 288 days.

(21) Appl. No.: 14/387,925

(22) PCT Filed: Apr. 25, 2014

(86) PCT No.: PCT/JP2014/061756
§ 371 (c)(1),
(2) Date: Sep. 25, 2014

(87) PCT Pub. No.: WO2015/162788
PCT Pub. Date: Oct. 29, 2015

(65) Prior Publication Data
US 2016/0236078 A1   Aug. 18, 2016

(51) Int. Cl.
*A63F 13/24* (2014.01)
*A63F 13/00* (2014.01)
(Continued)

(52) U.S. Cl.
CPC ............. *A63F 13/24* (2014.09); *A63F 13/00* (2013.01); *A63F 13/214* (2014.09); *A63F 13/49* (2014.09); *A63F 13/95* (2014.09)

(58) Field of Classification Search
None
See application file for complete search history.

(56) References Cited

U.S. PATENT DOCUMENTS

| 4,890,832 A * | 1/1990 | Komaki | G06F 15/0225 235/146 |
| 6,773,325 B1 * | 8/2004 | Mawle | A63F 13/02 446/175 |

(Continued)

FOREIGN PATENT DOCUMENTS

| JP | 2003-944 | 1/2003 |
| JP | 2005-319175 | 11/2005 |

(Continued)

OTHER PUBLICATIONS

Patent Abstracts of Japan, Publication No. 2003-000944, published Jan. 7, 2003.

(Continued)

*Primary Examiner* — James S McClellan
*Assistant Examiner* — Peter Iannuzzi
(74) *Attorney, Agent, or Firm* — Staas & Halsey LLP

(57) ABSTRACT

In a gaming system to progress a battle game using game progression information in one gaming device and another gaming device, a controller of the one gaming device allows a storage unit to store the game progression information read by a reader and identifies a detected finger motion pattern. When the finger motion pattern coincides with a finger motion pattern for input in the stored game progression information, the controller allows at least part of the game progression information to be transmitted toward the other gaming device through a communication unit to be used for the progress of the game in the other gaming device. The controller acquires the game progression information in the other gaming device through the communication unit and allows the progress of the battle game using the acquired information.

14 Claims, 6 Drawing Sheets

(51) Int. Cl.
  *A63F 13/214* (2014.01)
  *A63F 13/95* (2014.01)
  *A63F 13/49* (2014.01)

(56) References Cited

U.S. PATENT DOCUMENTS

| | | | | |
|---|---|---|---|---|
| 2002/0097229 | A1* | 7/2002 | Rose | G06F 1/1626 345/173 |
| 2006/0040746 | A1* | 2/2006 | Eguchi | A63F 1/02 463/43 |
| 2006/0046808 | A1* | 3/2006 | Hiranoya | G07F 17/3269 463/9 |
| 2007/0082723 | A1* | 4/2007 | Ohashi | A63F 13/12 463/16 |
| 2007/0184900 | A1* | 8/2007 | Matsumoto | A63F 13/42 463/37 |
| 2007/0275782 | A1* | 11/2007 | Kaji | A63F 1/02 463/43 |
| 2008/0192300 | A1* | 8/2008 | Kenji | A63F 13/00 358/3.29 |
| 2008/0200226 | A1* | 8/2008 | Ichimura | A63F 13/10 463/8 |
| 2008/0207324 | A1* | 8/2008 | Hiroshige | A63F 13/10 463/33 |
| 2010/0137050 | A1* | 6/2010 | Yoshida | A63F 13/10 463/8 |
| 2011/0049234 | A1* | 3/2011 | Yoshida | G06F 3/0421 235/380 |
| 2011/0263338 | A1* | 10/2011 | Horie | A63F 1/04 463/43 |
| 2014/0302923 | A1* | 10/2014 | Sato | A63F 13/847 463/31 |

FOREIGN PATENT DOCUMENTS

| | | |
|---|---|---|
| JP | 2007-144145 | 6/2007 |
| JP | 2009-542259 | 12/2009 |
| JP | 2010-148781 | 7/2010 |
| JP | 2011-5019 | 1/2011 |

OTHER PUBLICATIONS

Magazine Article, "Blitz Arcade", Playstation 8/13 game: WCCF11-12, Ver. 2.0, vol. 37, Published by ASCII Media Works, Japan, Jan. 29, 2013, (4 pages including p. 11).

International Search Report mailed Jul. 22, 2014, in corresponding International Patent Application No. PCT/JP2014/061756.

International Preliminary Report on Patentability dated Oct. 25, 2016 in corresponding International Patent Application No. PCT/JP2014/061756.

* cited by examiner

FIG.6
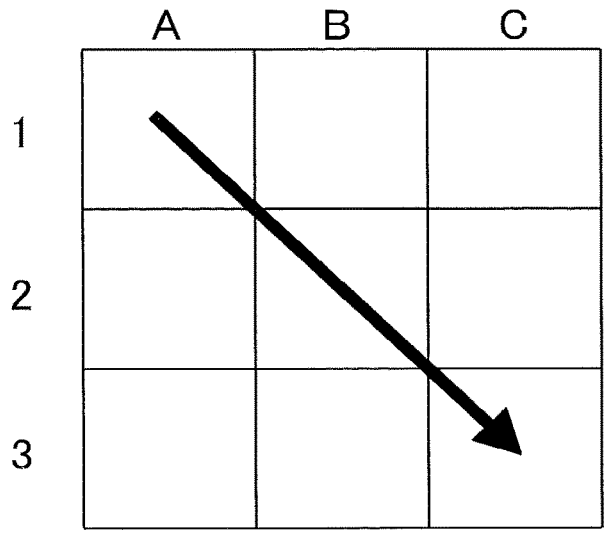
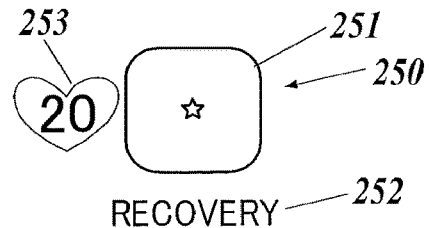
FIG.7A
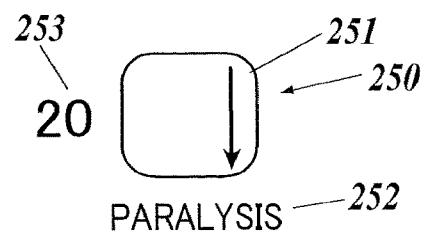
FIG.7B
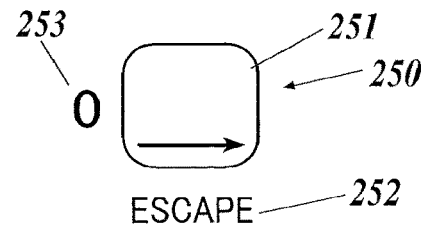
FIG.7C

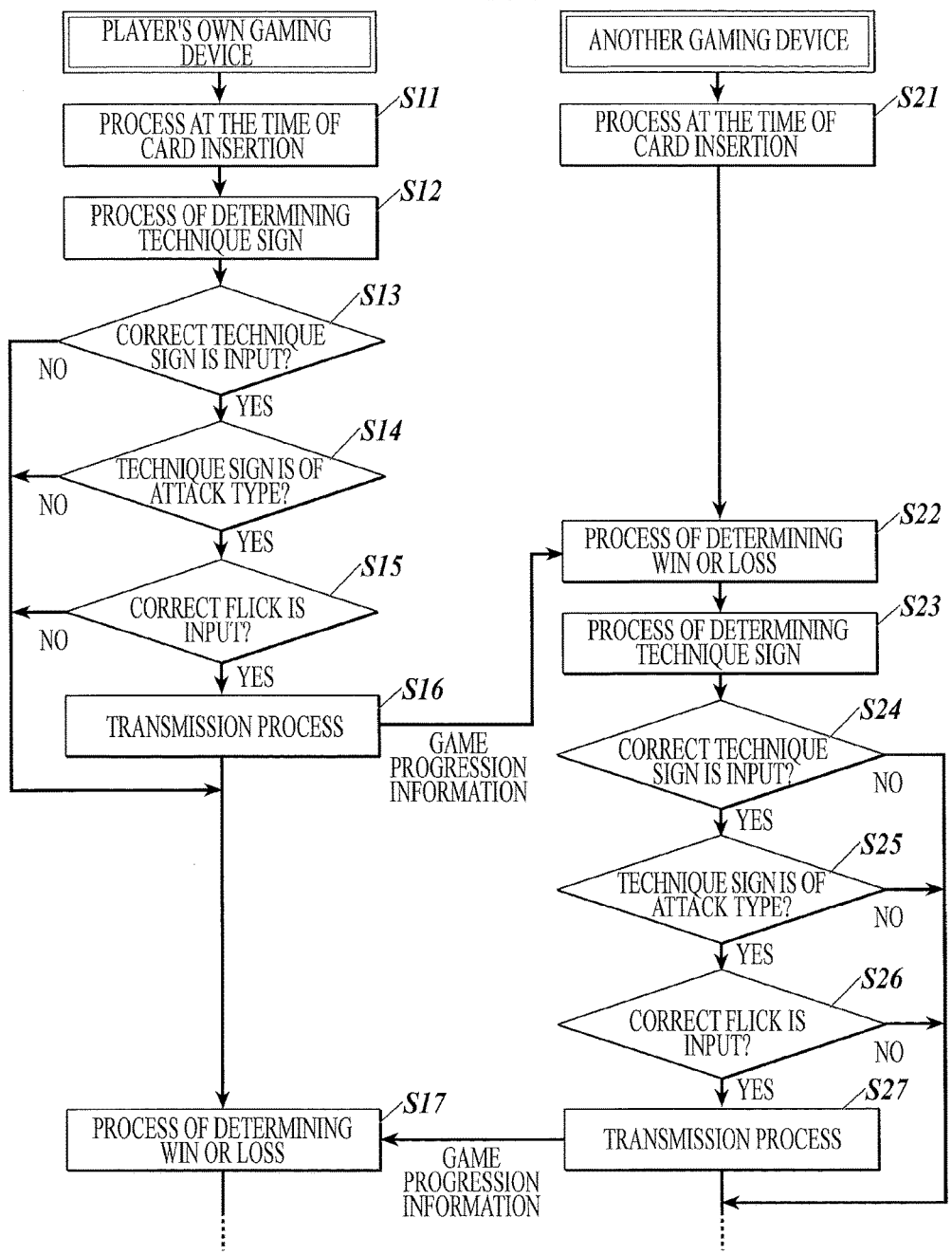

GAMING SYSTEM AND GAMING DEVICE

CROSS-REFERENCE TO RELATED APPLICATIONS

This application is a U.S. National Stage Application, which claims the benefit under 35 U.S.C. 371 of PCT International Patent Application No. PCT/JP2014/061756, filed Apr. 25, 2014, the contents of which are incorporated herein by reference.

TECHNICAL FIELD

The present invention relates to a gaming system and a gaming device.

BACKGROUND ART

Examples of traditional battle games include a card game in which players use their cards to determine the win or loss, an online game in which a player plays against any online player using a portable gaming device or smartphone, and an arcade game in which a player plays against a computer embedded in a housing (see Patent Literature 1, for example).

PRIOR ART

Patent Literature 1: Japanese Unexamined Patent Application Publication No. 2003-944

Unfortunately, players merely enjoy these games independently and cannot play a complex game made by a combination of these games. A proposed countermeasure is to provide a gaming device with which a player can battle against a computer by inserting a battle game card into the gaming device. Such a gaming device simulates battle card games that people can play only by meeting in reality and using cards, and allows battle arcade games, which are playable only with stationary machines, to be played anywhere. The gaming device includes a touch panel and a liquid crystal display. Thus, the players can simulate such games through the operation of the touch panel of a smartphone.

Such a gaming device, however, enables a person to battle against a computer, but not against another person through communication. Besides, the gaming device is often expensive because it includes the touch panel and the liquid crystal display (LCD), and a GPU, a VRAM, an LCD controller, and other components for the presentation of game images on the liquid crystal display.

SUMMARY OF THE INVENTION

An object of the present invention, which has been made to solve such problems, is to provide a gaming system allowing people to play battle games while communicating with each other using cards and to provide an inexpensive gaming device.

To satisfy this object, the present invention provides a first gaming system to progress a predetermined game using game progression information in one gaming device and game progression information acquired from another gaming device, the system including: a card to be used for the progress of the game; the card including: an image display part displaying an image of a finger motion pattern for input or an image corresponding to the finger motion pattern for input; and an information recording part in which the game progression information is recorded, the game progression information including identifying information on the finger motion pattern for input and information associated with the identifying information on the finger motion pattern for input; the one gaming device including: a card holder capable of holding the card such that at least the image display part is visible from the front side thereof; a reader to read the game progression information of the card held in the card holder; a storage unit to store a game progression program that allows the progress of the game; a communicating unit to communicate with the another gaming device; a touch sensor to detect an actual finger motion pattern; and a controller to allow the storage unit to store the game progression information read by the reader; to identify the finger motion pattern detected by the touch sensor; to allow at least part of the game progression information to be transmitted toward the another gaming device through the communicating unit when the finger motion pattern coincides with the finger motion pattern for input in the game progression information stored in the storage unit, the at least part of the game progression information being to be used for the progress of the game in the another gaming device; to acquire the game progression information in the another gaming device through the communicating unit; and to allow the progress of the game using the acquired information.

In a second gaming system the another gaming device includes: a card holder capable of holding the card such that at least the image display part is visible from the front side thereof; a reader to read the game progression information of the card held in the card holder; a storage unit to store a game progression program that allows the progress of the game; a communicating unit to communicate with the one gaming device; a touch sensor to detect an actual finger motion pattern; and a controller to allow the storage unit to store the game progression information read by the reader; to identify the finger motion pattern detected by the touch sensor; to allow at least part of the game progression information to be transmitted toward the one gaming device through the communicating unit when the finger motion pattern coincides with the finger motion pattern for input in the game progression information stored in the storage unit, the at least part of the game progression information being to be used for the progress of the game in the one gaming device; to acquire the game progression information in the one gaming device through the communicating unit; and to allow the progress of the game using the acquired information.

In a third gaming system, the controller transmits, as the at least part of the game progression information, the identifying information on the finger motion pattern for input or the information associated with the identifying information in the game progression information.

In a fourth gaming system, the card includes the image display part displaying an image of a plurality of the finger motion patterns for input; and the information recording part in which the game progression information is recorded, the game progression information including the identifying information on the plurality of finger motion patterns for input and the information associated with the identifying information on the plurality of finger motion patterns for input; the one gaming device includes a determiner to determine a finger motion pattern for input from among the plurality of finger motion patterns for input; the controller identifies the finger motion pattern detected by the touch sensor, wherein when the finger motion pattern coincides with the finger motion pattern for input determined by the determiner, the controller allows at least part of the game progression information to be transmitted toward the another gaming device through the communicating unit, the at least part of the game progression information being to be used for the progress of the game in the another gaming device.

In a fifth gaming system, the determiner includes: a plurality of pilot lamps disposed in connection with the plurality of finger motion patterns for input, respectively; an operating unit operable by a player; and a detector to detect the operation of the operating unit, wherein switching indication starts in response to the operation of the operating unit detected by the detector and stops in response to the operation of the operating unit detected again by the detector after the start of the switching indication, the switching indication being sequential switching of a position of a lighted pilot lamp among the plurality of pilot lamps, and the finger motion pattern for input is determined to be the finger motion pattern for input corresponding to the lighted pilot lamp at a time of the stopping of the switching indication.

In the sixth gaming system, the information recording part, the game progression information is recorded, the game progression information including force parameter information inherent in the card; the information associated with the identifying information on the finger motion pattern for input includes attack parameter information; when the controller acquires the attack parameter information from the another gaming device, the controller allows the storage unit to store a value as the latest force parameter information, the value being obtained by subtracting a numeric value based on the acquired attack parameter information from a numeric value based on the force parameter information stored in the storage unit; and when the value obtained by the subtraction is zero or less, win or loss of the game is determined.

In a seventh gaming system, the information recording part, the game progression information is recorded, the game progression information including attribute information inherent in the card; the information associated with the identifying information on the finger motion pattern for input includes the attribute information; and when the controller acquires the attribute information together with the attack parameter information from the another gaming device, the controller can modify the numeric value based on the acquired attack parameter information or the numeric value based on the force parameter information stored in the storage unit, in accordance with a relationship between the acquired attribute information and the attributed information stored in the storage unit.

In an eighth gaming system, an indicator can be provided to indicate the numeric value based on the force parameter information.

In a ninth gaming system, the indicator indicates the numeric value based on the force parameter information by at least one of audio representation and light-emitting representation.

In a tenth gaming system, the information recording part of the card, the game progression information can be recorded, the game progression information including replacing information for replacing the card with another card, as the information associated with the identifying information on the finger motion pattern for input; and the controller identifies the finger motion pattern detected by the touch sensor, wherein when the finger motion pattern coincides with the finger motion pattern for input associated with the replacing information, the controller allows the storage unit to store the game progression information of the another card newly read by the reader to allow the progress of the game.

In an eleventh gaming system, the information recording part of the card, the game progression information can be recorded, the game progression information including card evolution information for replacing the card with an evolved card as the another card having a numeric value higher than the numeric value based on at least one of the force parameter information and the attack parameter information of the card.

In a twelfth gaming system, the information recording part of the card, the game progression information can be recorded, the game progression information including recovery information for recovering the numeric value based on the force parameter information of the card, as the information associated with the identifying information on the finger motion pattern for input; and the controller identifies the finger motion pattern detected by the touch sensor, wherein when the finger motion pattern coincides with the finger motion pattern for input associated with the recovery information, the controller allows the storage unit to store the force parameter information having the recovered numeric value, as the latest force parameter information.

In a thirteenth gaming system, the information recording part of the card, the game progression information can be recorded, the game progression information including invalidity information indicating that at least part of the game progression information cannot be transmitted, as the information associated with the identifying information on the finger motion pattern for input; and when the controller acquires the invalidity information from the another gaming device, the controller allows the indicator to indicate that the at least part of the game progression information cannot be transmitted.

The invention also is directed to a fourteenth gaming device to progress a predetermined game through transmission and reception of game progression information to and from another gaming device, the gaming device including: a card holder capable of holding a card such that an image of a finger motion pattern for input or an image corresponding to the finger motion pattern for input on the card is visible at least from the front side thereof; a reader to read the game progression information of the card held in the card holder; a storage unit to store a game progression program that allows the progress of the game; a communicating unit to communicate with the another gaming device; a touch sensor to detect an actual finger motion pattern; and a controller to allow the storage unit to store the game progression information read by the reader; to identify the finger motion pattern detected by the touch sensor; to allow at least part of the game progression information to be transmitted toward the another gaming device through the communicating unit when the finger motion pattern coincides with the finger motion pattern for input in the game progression information stored in the storage unit, the at least part of the game progression information being to be used for the progress of the game in the another gaming device; to acquire the game progression information of the another gaming device through the communicating unit; and to allow the progress of the game using the acquired information.

According to the present invention, one gaming device transmits game progression information obtained from one card to another gaming device via a communicating unit. The other gaming device transmits game progression information to the one gaming device via a communicating unit. The information is used for the progression of the game. This achieves the combination of a traditional card game and a machine game and enables the progression of the game without presentation of game images, resulting in an inexpensive gaming device.

BRIEF DESCRIPTION OF DRAWINGS

FIG. 6 illustrates a finger motion pattern on a transparent touch panel.

FIG. 7A illustrates a technique sign.

FIG. 7B illustrates a technique sign.

FIG. 7C illustrates a technique sign.

FIG. 8 is a flow chart of a battle game in a gaming system of the embodiment.

DETAILED DESCRIPTION

Embodiments of the present invention will now be described with reference to the attached drawings.

In a first embodiment, a gaming system executes a battle game using game progression information that one gaming device acquires from one card and game progression information that another gaming device acquires from another card.

Figure 1:
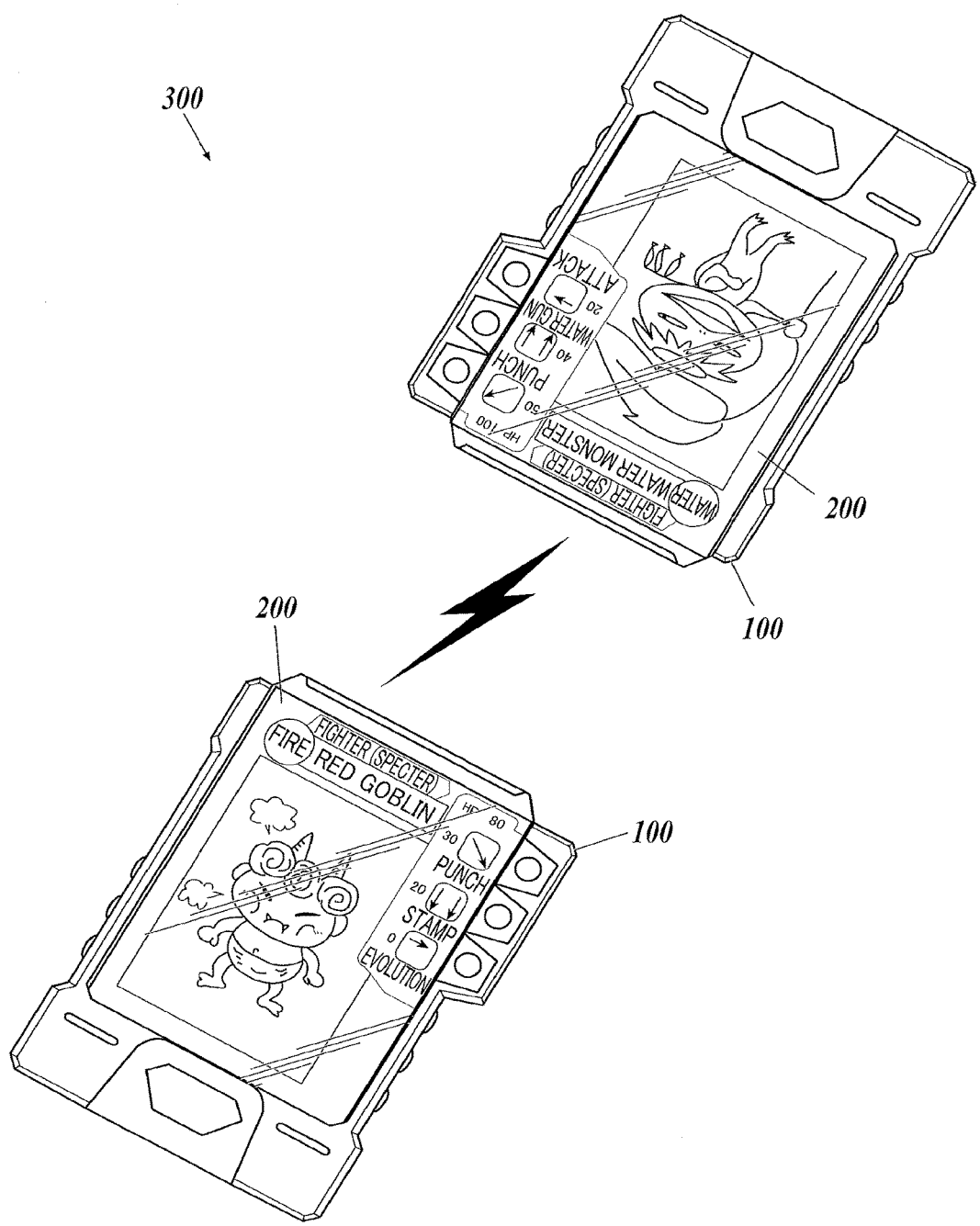
FIG. 1 illustrates the configuration of a gaming system of an embodiment.

FIG. 1 illustrates the configuration of a gaming system 300 of the present invention.

As shown in FIG. 1, the gaming system 300 includes one gaming device 100, a card 200 inserted into the one gaming device 100, another gaming device 100, and a card 200 inserted into the other gaming device 100.

Figure 2:
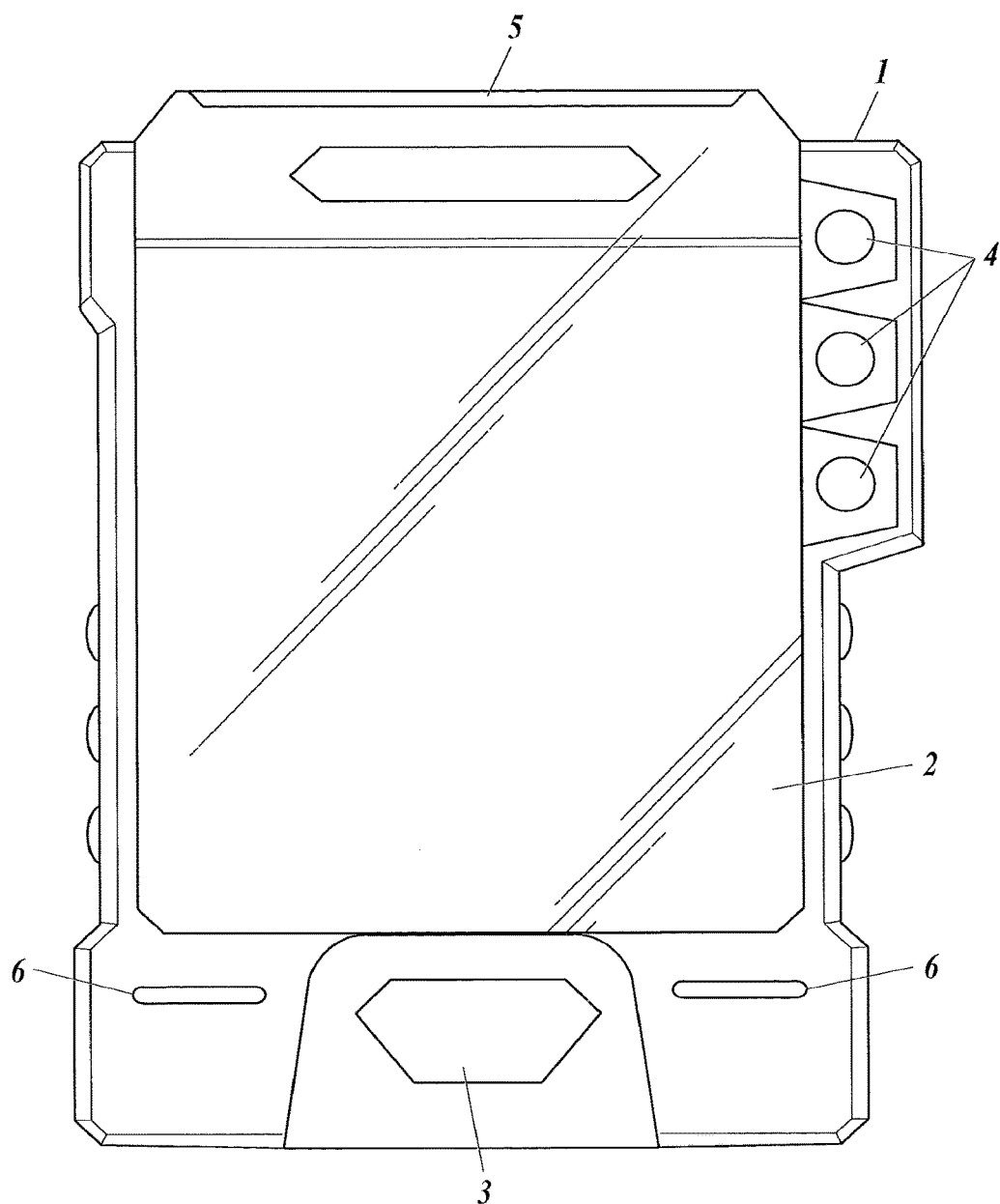
FIG. 2 illustrates a gaming device.

FIG. 2 is a plan view of the gaming device 100.

As shown in FIG. 2, the gaming device 100 includes a housing 1 including a touch sensor 2, an operation input unit (operating unit) 3, a light-emitting part (indicator) 4, an infrared communicating unit (communicating unit) 5, and speakers (indicator) 6. The gaming device 100 is a portable device.

The housing 1 is made of a plastic, a resin, a metal, and/or other materials. Components inside the housing 1 and other components not depicted in FIG. 2 will be described later.

The touch sensor 2 includes a transparent touch panel and detects user's touch point on the transparent touch panel and thus user's operation to generate electrical signals according to the operation. The signals are supplied to a CPU 10, which will be described later, as input signals.

The touch sensor 2 is disposed at the housing 1 with a slot between the back surface of the transparent touch panel and a flat surface of the housing 1, the slot allowing the card 200 to be inserted into it. The front surface of the card 200 inserted in the gaming device 100 is visible through the transparent touch panel (see FIG. 1). The housing 1 and the touch sensor 2 accordingly serve as a card holder.

The card 200 can be inserted into the slot from the upper end of the gaming device 100.

The operation input unit (operating unit and determiner) 3 is composed of a button below the touch sensor 2. The player operates the button of the operation input unit 3 to input instructions for the progress of the game.

The light-emitting part (determiner and indicator) 4 is composed of three light-emitting diodes (pilot lamps), which are arranged in one column adjacent to the upper right of the touch sensor 2. As shown in FIG. 1, when the card 200 is inserted in the gaming device 100, the light-emitting diodes are arranged in one column right beside three technique signs 250, respectively, depicted on the front surface of the card 200.

The infrared communicating unit (communicating unit) 5 communicates with another gaming device 100. In this embodiment, the infrared communicating unit 5 transmits and receives game progression information, which will be described later, to/from the other gaming device 100.

The speakers (indicator) 6 output sounds in response to the operation input through the touch sensor 2 or the operation input unit 3 during the game or settings. In this embodiment, the speakers 6 output sounds (e.g., sound effect and voice) depending on the progression of the game (battle game).

Figure 3:
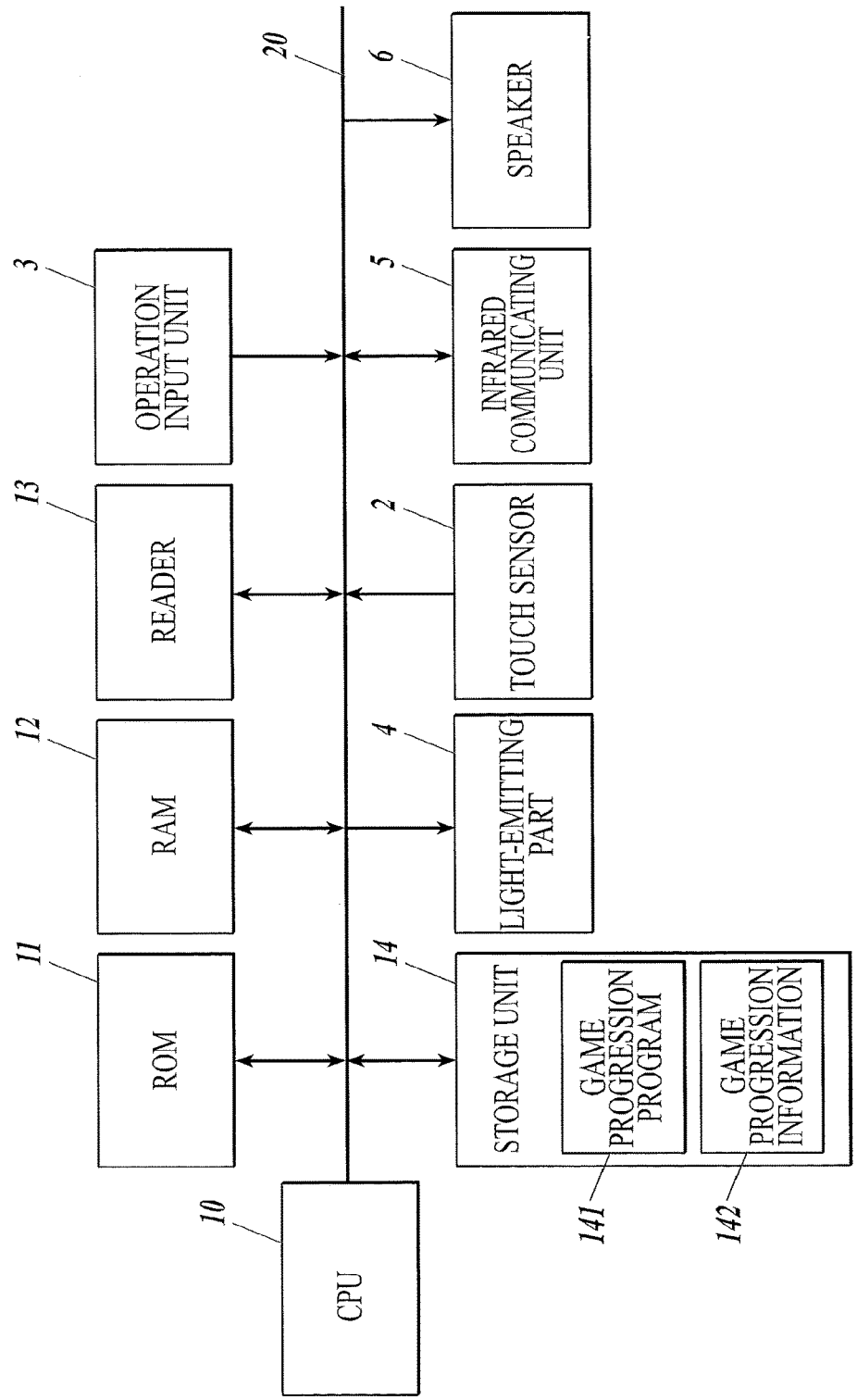
FIG. 3 is a block diagram of the gaming device of FIG. 2.

FIG. 3 is a block diagram illustrating the function of the gaming device 100.

As shown in FIG. 3, the gaming device 100 includes a CPU (controller, determiner, and detector) 10, a ROM 11, a RAM 12, a reader 13, a storage unit 14, the touch sensor 2, the operation input unit 3, the light-emitting part 4, the infrared communicating unit 5, the speakers 6, and a bus 20 for connection between the CPU 10 and individual components.

The CPU 10, which performs logical operations, comprehensively controls the entire operations of the gaming device 100. In this embodiment, the CPU 10 controls the progress of the game according to a game progression program 141 described later.

The ROM 11 stores various programs executed by the CPU 10 and the default data.

The RAM 12 provides the CPU 10 with a working memory space and stores temporary working data.

The reader 13 reads a stealth code 260 (see FIG. 4), which will be described later, printed on the card 200. Although not shown, the reader 13 is composed of multiple pairs of positive and negative metal terminals.

When the card 200 is inserted, the terminals coming into contact with conductive rectangular regions of the stealth code 260 made by carbon printing allow an electric current to flow; whereas the terminals coming into contact with non-conductive rectangular regions (without carbon printing) do not allow an electric current to flow. The reader 13 reads the stealth code 260 by reading binary numbers, for example, "1" representing an electrically connected region and "0" representing an electrically unconnected region.

The storage unit 14 is a nonvolatile read/write memory, such as a flash memory or an electrically erasable and programmable read only memory (EEPROM). The storage unit 14 stores the game progression program 141. When the card 200 is inserted into the gaming device 100, the game progression information in the card 200 is stored in the storage unit 14.

The game progression program 141 provides the CPU 10 with a function of advancing the battle game.

More specifically, the CPU 10 executes the game progression program 141, allowing the storage unit 14 to store the game progression information on the basis of the stealth code 260 read by the reader 13.

Upon receiving an instruction through the operation input unit 3 after allowing the storage unit 14 to store the game progression information, the CPU 10 starts switching indication, which is sequential switching of the position of a lighted light-emitting diode among a plurality of light-emitting diodes in the light-emitting part 4. Upon receiving an instruction through the operation input unit 3 after the start of the switching indication, the CPU 10 stops the switching indication and determines a technique sign (finger motion pattern for input) 250 to be the one corresponding to the lighted light-emitting diode at the time of the stopping of the switching indication.

The CPU 10 also identifies the finger motion pattern detected by the touch sensor 2. If the finger motion pattern coincides with the technique sign (finger motion pattern for input) 250 determined by the CPU 10, the CPU 10 transmits at least part of game progression information 142 toward the other gaming device 100 through the infrared communicating unit 5.

The CPU 10 acquires, through the infrared communicating unit 5, at least part of game progression information that the other gaming device 100 has acquired from the other card 200, and advances the battle game using the acquired information. The details of the battle game will be described later.

The game progression information 142 is used for the progress of the battle game and contains a plurality of information items.

In particular, the game progression information 142 contains, for example, character identifying information, force parameter information (hit point: HP) associated with the character identifying information, technique sign 250 identifying information, information associated with the technique sign 250 identifying information (including information on the finger motion pattern for input, attack parameter information, card evolution information, recovery information, invalidity information, and replacing information).

The cards 200 used in the gaming system 300 will now be described.

Figure 4:
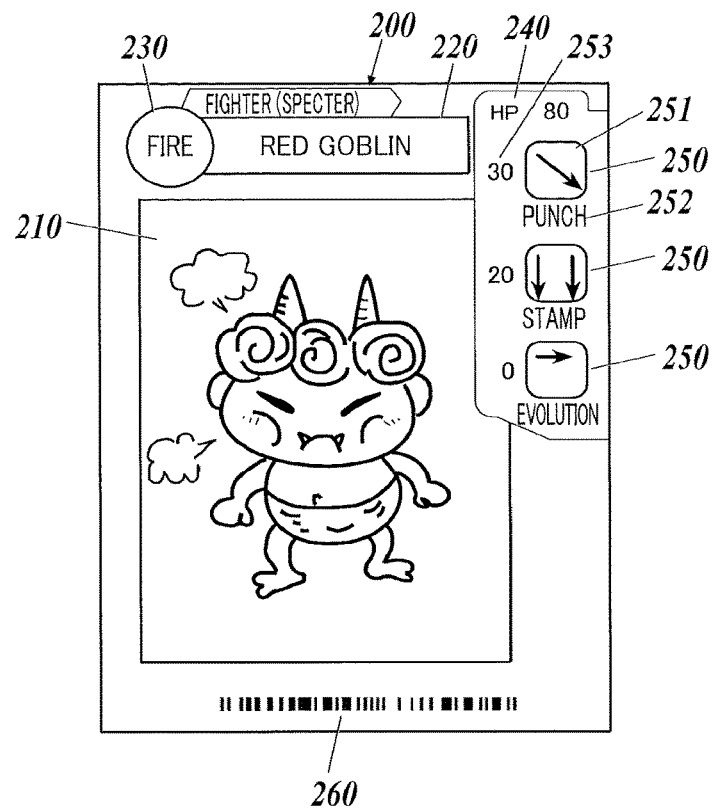
FIG. 4 illustrates a card for use in the gaming system of FIG. 1.

FIG. 4 illustrates an example of the card 200.

As shown in FIG. 4, an image 210 of a character (e.g., a "red goblin") is printed on the central part of the card 200. A character name 220, a character attribute (e.g., "fire") 230, and other items are printed above the image 210. An HP (force parameter information) 240 of the character and a plurality of (e.g. three) technique signs (image display part) 250 are printed on the upper right of the image 210. The stealth code (information recording part) 260 is printed below the image 210. The stealth code 260 consists of electrically conductive rectangular regions made by carbon printing and electrically non-conductive rectangular regions. The stealth code 260 represents the game progression information, i.e., the character identifying information, the force parameter information (HP) associated with the character identifying information, the technique sign 250 identifying information, the information associated with the technique sign 250 identifying information (such as the information on the finger motion pattern for input, the attack parameter information, the card evolution information, the recovery information, the invalidity information, and the replacing information), for example.

In this embodiment, the cards 200 are made in accordance with the size standard of commonly used trading cards (W: 63 mm×H: 88 mm). Thus, other trading cards can optionally be inserted into the gaming device 100 to be displayed, in place of the cards 200 in this embodiment. It should be appreciated that the size of the cards 200 does not necessarily meet the above size standard.

The technique signs (image display part) 250 printed on the card 200 will now be described in detail.

As shown in FIG. 4, each technique sign 250 includes an icon (finger motion pattern for input) 251, which is a sign (e.g., an arrow or star mark) enclosed in a box, a technique name 252 printed below the icon, and parameter information 253 printed on the left side of the icon 251.

The icon 251 represents the finger motion pattern for input used for the touch operation of the transparent touch panel of the touch sensor 2. If the user touches the transparent touch panel according to the finger motion pattern for input, the technique associated with the icon 251 can be performed.

For instance, the user can perform an attack technique represented by the technique name 252 of "punch" by moving a finger along regions 1-A, 2-B, and 3-C of the transparent touch panel in series as shown in FIG. 6, according to the finger motion pattern for input (the downward-sloping arrow) in the icon 251 corresponding to "punch". This can damage the opponent character (on the card 200 in the other gaming device 100) (or reduce the HP of the opponent character by 30).

At the performance of the attack technique, the level of the damage to the opponent character can be changed according to the relationship between the character attribute of the card 200 in the player's own gaming device 100 and the opponent character attribute.

In specific, the character attribute comes in three types: "fire", "water", and "forest". "Fire" is superior to "forest", "forest" is superior to "water", and "water" is superior to "fire". When the player's own character attribute is superior to the opponent character attribute, the level of the damage to the opponent character at the performance of the attack technique (the numeric value of the parameter information 253) can be doubled with a probability of ¼. In contrast, when the opponent character attribute is superior to the player's own character attribute, the level of the damage to the opponent character (the numeric value of the parameter information 253) is halved. When the player's own character attribute and the opponent character attribute are the same, the level of the damage remains unchanged.

The technique signs 250 include, in addition to the attack technique signs, a sign to evolve the card 200 in the gaming device 100 for the progress of the battle game (an evolution sign). For instance, when the user performs a technique represented by the technique name 252 of "evolution" (see FIG. 4) by touch operation according to the finger motion pattern for input in the icon 251 corresponding to "evolution", the card 200 representing the character (e.g., "red goblin") can be replaced with the card 200 representing a character with higher numeric values of HP and attack parameter information (e.g., "red ogre") (see FIG. 5) for the progress of the battle game.

Although not depicted in the card in the drawing, the technique signs 250 further include the following signs.

The first one is a recovery sign used to recover the force parameter information (HP) of the character, as illustrated in FIG. 7A. The performance of the technique associated with this sign increases the HP of the character by the numeric value (for example, "20") printed on the left side of the icon 251. The star mark (the finger motion pattern for input) in the icon 251 indicates an instruction to tap a predetermined point on the transparent touch panel.

The second one is a paralysis sign used to paralyze the opponent character, as illustrated in FIG. 7B. The performance of the technique associated with this sign gives the opponent character (on the card 200 in the other gaming device 100) a damage corresponding to the numeric value (for example, "20") printed on the left side of the icon 251 and makes the opponent character lose a turn for attack. While the opponent character loses a turn, the other gaming device 100 outputs a predetermined voice (e.g., "Paralyzed!") through the speakers 6. The output of the voice stops upon the subsequent attack from the other player.

The third one is a replacement sign used to replace the card 200 in the gaming device 100, as illustrated in FIG. 7C for the progress of the battle game. The performance of the technique associated with this sign allows the card 200 in the gaming device 100 to be replaced with another card 200 for the progress of the battle game. This prevents attacks on the character on the card 200 in the gaming device 100, which is particularly advantageous when the character has little remaining HP.

Each character is provided with an individual technique sign 250 depending on its type.

How to play a battle game with the gaming system 300 of this embodiment will be explained briefly by referring to the processes the CPU 10 carries out by executing the game progression program 141.

A gaming device 100 owned by player A is referred to as player's own gaming device 100, and a gaming device 100 owned by player B is referred to as another gaming device 100. In this battle game, the player A attacks first, and the player B then attacks.

FIG. 8 is a flow chart of processing for the progress of the game in the player's own gaming device 100 and the other gaming device 100. The processing for the progress of the game starts upon the power-up of the gaming devices 100.

Referring to FIG. 8, when a card 200 selected by the player A is inserted into the player's own gaming device 100, the CPU 10 executes a process at the time of card insertion (Step S11).

In the process at the time of card insertion, the CPU 10 allows the reader 13 to read game progression information from the stealth code 260 printed on the card 200, then allows the storage unit 14 to store the game progression information. Optionally, in the process at the time of card insertion, the CPU 10 may allow the speakers 6 to output sound or other effects associated with the character, based on the character identifying information in the game progression information.

The explanations of the process at the time of card insertion in the other gaming device 100 (Step S21), which is similar to that in the player's own gaming device 100 (Step S11), are omitted.

The CPU 10 in the player's own gaming device 100, which attacks first, then carries out a process of determining the technique sign (Step S12).

In the process of determining the technique sign, the player A presses the button of the operation input unit 3, and the CPU 10 receiving an instruction input through the operation input unit 3 allows the light-emitting part 4 to perform switching indication, which is sequential switching of the position of a lighted light-emitting diode among three light-emitting diodes. The player A presses the button of the operation input unit 3 again, and the CPU 10 receiving an instruction input through the operation input unit 3 stops the switching indication by the light-emitting part 4 and determines a technique sign 250 to be the one corresponding to the lighted light-emitting diode at the time of the stopping of the switching indication. If the player A does not press the button of the operation input unit 3 during a predetermined period from the start of the switching indication, the switching indication may be automatically stopped.

The CPU 10 in the player's own gaming device 100 then identifies the detected finger motion pattern on the touch sensor 2 input by the player A, and, in Step S13, determines if this finger motion pattern coincides with the finger motion pattern for input associated with the technique sign 250 determined in the process of determining the technique sign (Step S12). To perform the technique corresponding to the technique sign 250, a touch operation on the touch sensor 2 should be carried out within a predetermined time period, for example, two seconds after the output of sounds promoting touch operation (e.g., "Ready Go.").

If the detected finger motion pattern coincides with the finger motion pattern for input associated with the technique sign 250 determined in the process of determining the technique sign ("Yes" in Step S13), then the CPU 10 determines if the technique sign 250 is of an attack type (including the paralysis sign) (Step S14).

If the technique sign 250 is of an attack type ("Yes" in Step S14), then the CPU 10 identifies the detected finger motion pattern on the touch sensor 2 input by the player A again, and determines if this finger motion pattern coincides with a flick motion pattern (Step S15). The flick motion pattern is a pattern to be made by moving a finger along regions 3-B, 2-B, and 1-B of the transparent touch panel (see FIG. 6) in series. The touch operation (flick motion) on the touch sensor 2 should be carried out within a predetermined time period, for example, three seconds from the start of the output of countdown voices (e.g., "3, 2, 1, 0.") announcing a residual time of three seconds.

If the detected finger motion pattern coincides with the flick motion pattern ("Yes" in Step S15), then the CPU 10 transmits at least part of the game progression information 142 (e.g. the attack parameter information associated with the technique sign 250 of an attack type and the invalidity information associated with the paralysis sign) in the storage unit 14 toward the other gaming device 100 through the infrared communicating unit 5 (Step S16). At this time, the CPU 10 may allow the speakers 6 to output sound or other effects associated with the attack.

If the detected finger motion pattern does not coincide with the finger motion pattern for input associated with the technique sign 250 determined in the process of determining the technique sign (including the case in which the touch operation of the touch sensor 2 is not carried out within a predetermined time period) ("No" in Step S13), then the turns for attack and defend are exchanged between the players A and B.

If the technique sign 250 is not of an attack type ("No" in Step S14), i.e., if the technique associated with any of the evolution sign, the recovery sign, and the replacement sign is performed, then a process associated with the performed technique is carried out and the turns for attack and defend are exchanged between the players A and B.

Figure 5:
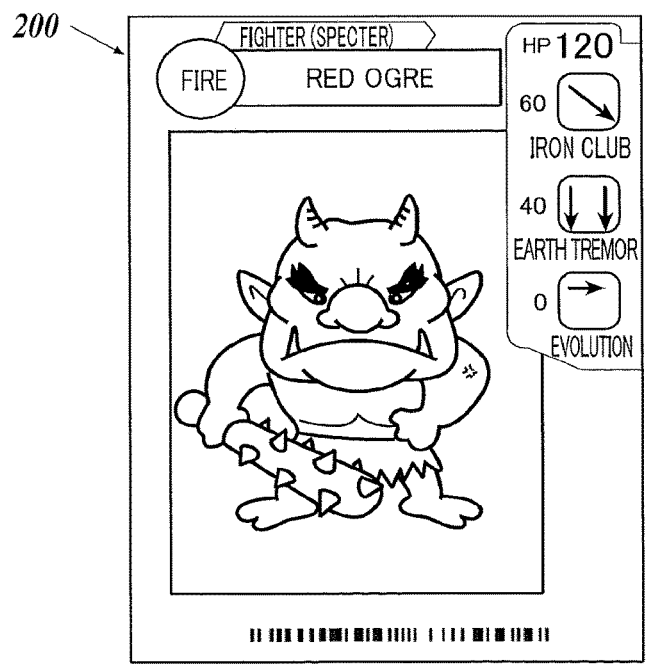
FIG. 5 illustrates a card for use in the gaming system of FIG. 1.

More specifically, if the technique associated with the evolution sign is performed, then the player A replaces the card 200 in the player's own gaming device 100 (see FIG. 4) with an evolved card (see FIG. 5). In response to this replacement, the CPU 10 allows the reader 13 to read game progression information from the stealth code 260 printed on the card 200 after the replacement. The CPU 10 then allows the storage unit 14 to store the game progression information.

If the technique associated with the recovery sign is performed, then the CPU 10 updates the numeric value of the force parameter information (HP) of the character in accordance with recovery information corresponding to the recovery sign in the storage unit 14 and allows the storage unit 14 to store the latest force parameter information.

If the technique associated with the replacement sign is performed, then the player A replaces the card 200 in the player's own gaming device 100 with another card. In response to this replacement, the CPU 10 allows the reader 13 to read game progression information from the stealth code 260 printed on the card 200 after the replacement. The CPU 10 then allows the storage unit 14 to store the game progression information.

If the detected finger motion pattern does not coincide with the flick motion pattern (including the case in which the touch operation of the touch sensor 2 is not carried out in a predetermined time period) ("NO" in Step S15), then the turns for attack and defend are exchanged between the players A and B.

When the other gaming device 100 receives at least part of the game progression information 142 from the player's own gaming device 100 through the infrared communicating unit 5 (Step S16), the CPU 10 carries out a process of determining the win or loss of the battle game (Step S22).

In the process of determining the win or loss, the CPU 10 reads, from the storage unit 14, the force parameter information of the character on the card 200 in the other gaming device 100. The CPU 10 then subtracts, from the numeric value of the force parameter information, the numeric value of the attack parameter information (the at least part of the game progression information 142) received from the player's own gaming device 100, and determines if the obtained numeric value of the force parameter information is zero or less.

If the obtained numeric value of the force parameter information is determined to be not zero or less in this process, then the CPU 10 allows the storage unit 14 to store the obtained force parameter information. The turns for attack and defend are then exchanged between the players A and B. Subsequently, the CPU 10 in the other gaming device 100 carries out Steps S23 to S27, and the CPU 10 in the player's own gaming device 100 carries out Step S17 (the process of determining the win or loss). Exchange of the turns for attack and defend between the players A and B is repeated until either the numeric value of the force parameter information of the card 200 in the player's own gaming device 100 or the numeric value of the force parameter information on the card 200 in the other gaming device 100 becomes zero or less. If the technique associated with the paralysis sign, for example, is performed in the player's own gaming device 100, i.e., if the other gaming device 100 receives attack parameter information together with invalidity information from the player's own gaming device 100, the player A continues the attack without the exchange of the turns for attack and defend between the players A and B.

The explanations of the process in Steps S23 to S27, which is similar to that in Steps S12 to S16, and the explanations of the process in Step S17, which is similar to that in Step S22, are omitted.

If the calculated numeric value of the force parameter information is determined to be zero or less in Step S17 or S22, the CPU 10 allows the speakers 6 to output voices announcing the loss of the game (e.g., "You lose.") and ends the battle game.

During the battle game in this embodiment, pressing the button of the operation input unit 3 for a predetermined time period (e.g. two seconds) allows the speakers 6 to output voices indicating the numeric value of the force parameter information of the card 200 in the gaming device 100. The numeric value of the force parameter information can also be indicated by operating three light-emitting diodes in the light-emitting part 4 in specific patterns. For instance, turning on all the three light-emitting diodes indicates that the current numeric value of the force parameter information ranges from 70% to 100% of the original numeric value of the force parameter information (a numeric value calculated before opponent's attack). Turning on two light-emitting diodes (the middle and bottom light-emitting diodes) indicates that the current numeric value of the force parameter information ranges from 40% to 70% of the original numeric value of the force parameter information. Turning on a single light-emitting diode (the bottom light-emitting diode) indicates that the current numeric value of the force parameter information ranges from 10% to 40% of the original numeric value of the force parameter information. Turning off all the three light-emitting diodes indicates that the current numeric value of the force parameter information ranges from 0% to 10% of the original numeric value of the force parameter information.

The advantages of the gaming system 300 with such a configuration will now be described.

The gaming system 300 exchanges, via the infrared communicating unit 5, the game progression information 142 that one gaming device 100 acquires from one card 200, and the game progression information 142 that another gaming device 100 acquires from another card 200, to use the information 142 for the progress of a battle game. This achieves a combination of a traditional card game and a machine game.

To transmit the game progression information 142 to the other gaming device 100, the finger motion pattern input by the touch operation of the touch sensor 2 should coincide with the finger motion pattern for input (the technique sign 250) in the game progression information 142 in the storage unit 14. The progress of the battle game reflects the ability of the player. This increases the motivation of the players for the battle game.

In addition, the one card 200 has a plurality of finger motion patterns for input (the technique signs 250) registered to it, keeping the players from being bored with the touch operation of the touch sensor 2.

Selection of one of the finger motion patterns for input (the technique signs 250) requires an operation by the player with the button of the operation input unit 3. The player can thus select the finger motion pattern for input (the technique sign 250) that the player wants and can advance the battle game as the player desires.

Upon receiving attack parameter information from the other gaming device 100 during the battle game, the CPU 10 in the one gaming device 100 allows the storage unit 14 to store the latest force parameter information that is a value obtained by subtracting the numeric value based on the received attack parameter information from the numeric value of the force parameter information in the storage unit 14. If the obtained value is zero or less, then the CPU 10 determines the win or loss of the game. This ensures the fairness of the battle game.

Upon receiving, from the other gaming device 100, attack parameter information together with attribute information of the card 200 in the other gaming device 100 during the battle game, the numeric value based on the received attack parameter information can be changed according to the relationship between the received attribute information and the attribute information of the card 200 in the player's own gaming device 100. Thus, the players can negotiate when the card 200 to be inserted into the gaming device 100 is selected. This makes it more interesting to play the battle game.

During the battle game, pressing the button of the operation input unit 3 for a predetermined time period (e.g. two seconds) allows the speakers 6 to output voices indicating the numeric value (HP) based on the force parameter information. The numeric value based on the force parameter information can also be indicated by operating the light-emitting diodes in the light-emitting part 4 in specific patterns. This makes the numeric value based on the force parameter information noticeable, so that the players can develop strategies efficiently. This makes it more interesting to play the battle game.

Some cards 200 used for the battle game have a replacement sign (a motion pattern for input) registered to them. If a touch operation of the touch sensor 2 coincides with the replacement sign, then such a card 200 can be replaced with another card 200 for the progress of the battle game.

Some cards 200 have an evolution sign (a motion pattern for input) registered to them. If a touch operation of the touch sensor 2 coincides with the evolution sign, then such a card 200 can be replaced with an evolved card 200 for the progress of the battle game.

Some cards 200 have a recovery sign (a motion pattern for input) registered to them. If a touch operation of the touch sensor 2 coincides with the recovery sign, then such a card 200 can have a recovered numeric value of force parameter information.

Some cards 200 have a paralysis sign (a motion pattern for input) registered to them. If a touch operation of the touch sensor 2 coincides with the paralysis sign, attacks from another gaming device 100 can be avoided.

Thus, the card 200 has not only a technique sign 250 to attack the opponent but also a sign 250 to perform one of the above-described specific techniques. Thus, the players can negotiate when the card 200 to be inserted into the gaming device 100 is selected. This makes it more interesting to play the battle game.

The gaming device 100 of this embodiment enables the progression of the battle game without presentation of game images, resulting in an inexpensive gaming device 100.

It should be understood that the present invention is not limited to the above embodiment and various modifications can be made without departing from the spirit of the invention.

In the above embodiment, one gaming device 100 determines the win or loss (Step S17 or S22) upon receiving attack parameter information from another gaming device 100. When the loss is determined in the process of determining the win or loss, the one gaming device 100 may transmit win-loss determination information, i.e., information on the win to the other gaming device 100 that has transmitted the attack parameter information to the one gaming device. In the gaming device 100 receiving the information on the win, the CPU 10 may allow the speakers 6 to output voices announcing the win (for example, "You win.").

The touch sensor 2, which is a transparent touch panel in the above embodiment, may be any touch sensor that can detect the actual finger motion pattern. For example, a matrix switch may be disposed on the card holder of the gaming device. The matrix switch detects a finger motion pattern input by a touch operation performed by the player over a card mounted to the cardholder. When the player presses part of the matrix switch consisting of switches composed of electrodes arranged in a matrix, upper and lower layers (electrodes) come into contact with each other, and the resulting electrical circuit detects positional (row and column) information.

In the above embodiment, the first press of the button of the operation input unit 2 starts the switching indication to determine the technique sign 250, and the second press of the button of the operation input unit 2 stops the switching indication. Alternatively, the press of the button of the operation input unit 2 may be required for at least the end of the switching indication. In this case, the switching indication starts automatically in response to the insertion of the card 200 into the gaming device 100, for example.

In the exchange of the turns for attack and defend between the player A (the player's own gaming device 100) and the player B (the other gaming device 100) in the above embodiment, flag information may be given to the gaming device 100 having a turn for attack so as to forbid the gaming device 100 without the flag information to transmit attack parameter information.

In the above embodiment, the complexity of the motion pattern for input may increase with the increasing numeric value of the attack parameter information.

The gaming devices 100 transmit and receive game progression information via infrared communication in the above embodiment, but may use any other wireless communication, such as Bluetooth (trademark) or wireless LAN.

In the above embodiment, the player A having the player's own gaming device 100 and the player B having the other gaming device 100 battle against each other. Alternatively, the player A having the player's own gaming device 100 may play the above-described battle game through communication against a computer embedded in a gaming machine (an arcade gaming machine). In such a case, the gaming machine does not require any cards 200 because its computer stores game progression information items corresponding to multiple cards (characters), respectively.

In the above embodiment, the reader 13 reads the stealth code 260 based on the conduction state of the rectangular electrically conductive regions with carbon print and rectangular electrically nonconductive regions of the stealth code 260. The game progression information may be read from the stealth code in any manner. For instance, the stealth code may be printed with a carbon ink absorbing infrared rays and irradiated with infrared rays from an irradiator in the reader, and the reflected rays are photographed by an infrared camera and analyzed to read the stealth code.

In the above embodiment, the finger motion pattern for input is shown by the icon 251 (the technique sign 250) of arrow, star, or other marks displayed on the card 200. Alternatively, the finger motion pattern for input may be shown by any image from which the player can know it, for example, an image corresponding to the finger motion pattern for input (such as an image of the character or the number indicating the input procedure) displayed on the card.

Of course, versions of the gaming systems described above can be combined. For example, the third gaming system is applicable to the second gaming system. The fourth gaming system is applicable to the second or third gaming systems. The eighth gaming system is applicable to the seventh gaming system. The tenth gaming system is applicable to any of the seventh to ninth gaming systems. The twelfth gaming system is applicable to any of the seventh to eleventh gaming systems. The thirteenth gaming system is applicable to any of the seventh to twelfth gaming systems.

The present invention is advantageously applied to the field of manufacturing gaming systems and gaming devices.

The invention claimed is:

1. A gaming system to progress a predetermined game using first game progression information in a first gaming device and second game progression information acquired from a second gaming device, the system comprising:
   a first card to be used for the progress of the game; the first card including:
      a first image display part printed on the first card, the first image display part displaying an image of at least one finger motion pattern for input or an image corresponding to the finger motion pattern for input; and
      a first information recording part printed as a stealth code on the first card, in which first information recording part the first game progression information is recorded, the first game progression information including information inherent in the first card, identifying information on the finger motion pattern for input, and information associated with the identifying information on the finger motion pattern for input;
   the first gaming device including:
      a first card holder capable of holding the first card such that at least the first image display part is visible from the first card holder;
      a first reader to read the first game progression information from the stealth code of the first card held in the first card holder;
      a first storage unit to store a game progression program that allows the progress of the game;
      a first communicating unit to communicate with the second gaming device;
      a first touch sensor to detect an actual finger motion pattern; and
      a first controller to allow the first storage unit to store the first game progression information read by the first reader, to identify the actual finger motion pattern detected by the first touch sensor, to allow at least part of the first game progression information to be transmitted to the second gaming device through the first communicating unit when the actual finger motion pattern coincides with the finger motion pattern for input in the first game progression information stored in the first storage unit, the at least part of the first game progression information being used for the progress of the game in the second gaming device, to acquire the second game progression information in the second gaming device through the first communicating unit, and to allow the progress of the game using the acquired information.

2. The gaming system according to claim 1, further comprising:
   a second card to be used for the progress of the game; the second card including:
      a second image display part printed on the second card, the second image display part displaying an image of at least one finger motion pattern for input or an image corresponding to the finger motion pattern for input; and
      a second information recording part printed as a stealth code on the second card, in which second information recording part the second game progression information is recorded, the second game progression information including information inherent in the first card, identifying information on the finger motion pattern for input, and information associated with the identifying information on the finger motion pattern for input, wherein the second gaming device comprises:
   a second card holder capable of holding the second card such that at least the second image display part is visible from the second card holder;
   a second reader to read the second game progression information from the stealth code of the second card held in the second card holder;
   a second storage unit to store a game progression program that allows the progress of the game;
   a second communicating unit to communicate with the first gaming device;
   a second touch sensor to detect an actual finger motion pattern; and
   a second controller to allow the second storage unit to store the second game progression information read by the second reader; to identify the actual finger motion pattern detected by the second touch sensor; to allow at least part of the second game progression information to be transmitted to the first gaming device through the second communicating unit when the actual finger motion pattern detected by the second touch sensor coincides with the finger motion pattern for input in the second game progression information stored in the second storage unit, the at least part of the second game progression information being used for the progress of the game in the first gaming device, to acquire the first game progression information in the first gaming device through the second communicating unit, and to allow the progress of the game using the information acquired through the second communicating unit.

3. The gaming system according to claim 1, wherein the first controller transmits, as the at least part of the first game progression information, the identifying information on the finger motion pattern for input or the information associated with the identifying information in the first game progression information.

4. The gaming system according to claim 1, wherein
   in the first card, the first image display part displays the image of a plurality of the finger motion patterns for input, and the information recording part records the first game progression information including the identifying information on the plurality of finger motion patterns for input and the information associated with the identifying information on the plurality of finger motion patterns for input;
   the first gaming device includes a determiner to determine a finger motion pattern for input from among the plurality of finger motion patterns for input;
   the first controller identifies the actual finger motion pattern detected by the first touch sensor and, when the actual finger motion pattern coincides with the finger motion pattern for input determined by the determiner, the first controller allows at least part of the first game progression information to be transmitted to the second gaming device through the first communicating unit, the at least part of the first game progression information being used for the progress of the game in the second gaming device.

5. The gaming system according to claim 4, wherein the determiner comprises:
   a plurality of lamps disposed in connection with the plurality of finger motion patterns for input, respectively;
   an operating unit operable by a player; and a detector to detect an operation of the operating unit by the player, wherein a switching indication starts in response to the operation of the operating unit detected by the detector and stops in response to the operation of the operating unit detected again by the detector after the start of the switching indication, the switching indication being sequential switching of a position of a lighted lamp among the plurality of lamps, and the finger motion pattern for input is determined to be the finger motion pattern for input corresponding to the lighted lamp at a time of the stopping of the switching indication.

6. The gaming system according to claim 2, wherein
the information inherent in the first and second cards includes first and second force parameter information;
the information associated with the identifying information on the finger motion pattern for input includes first and second attack parameter information;
when the first controller acquires the second attack parameter information from the second gaming device, the first controller allows the first storage unit to store a value as the latest first force parameter information, the value being obtained by subtracting a numeric value based on the acquired second attack parameter information from a numeric value based on the first force parameter information stored in the first storage unit; and
when the value obtained by the subtraction is zero or less, win or loss of the game is determined.

7. The gaming system according to claim 6, wherein
the information inherent in the first and second cards includes first and second attribute information,
when the first controller acquires the second attribute information together with the second attack parameter information from the second gaming device, the first controller can modify the numeric value based on the acquired second attack parameter information or the numeric value based on the first force parameter information stored in the first storage unit, in accordance with a relationship between the acquired second attribute information and the first attribute information stored in the first storage unit.

8. The gaming system according to claim 6, further comprising first and second indicators to indicate the numeric value based on the first and second force parameter information.

9. The gaming system according to claim 8, wherein the first and second indicators indicate the numeric value based on the first and second force parameter information by at least one of audio representation and light-emitting representation.

10. The gaming system according to claim 6, wherein
in the first or second information recording part of the first or second card, the first or second game progression information is recorded, the first or second game progression information including replacing information for replacing the first or second card with another card, as the information associated with the identifying information on the finger motion pattern for input; and
the first or second controller identifies the actual finger motion pattern detected by the first or second touch sensor, and when the actual finger motion pattern coincides with the finger motion pattern for input associated with the replacing information, the first or second controller allows the first or second storage unit to store game progression information of the another card newly read by the first or second reader to allow the progress of the game.

11. The gaming system according to claim 10, wherein in the first or second information recording part of the first or second card, the first or second game progression information is recorded, the first or second game progression information including card evolution information for replacing the first or second card with an evolved card as the another card having a numeric value higher than the numeric value based on at least one of the first or second force parameter information and the first or second attack parameter information of the first or second card.

12. The gaming system according to claim 6, wherein
in the first or second information recording part of the first or second card, the first or second game progression information is recorded, the first or second game progression information including recovery information for recovering the numeric value based on the first or second force parameter information of the first or second card, as the information associated with the identifying information on the finger motion pattern for input; and
the first or second controller identifies the actual finger motion pattern detected by the first or second touch sensor, and when the actual finger motion pattern coincides with the finger motion pattern for input associated with the recovery information, the first or second controller allows the first or second storage unit to store the first or second force parameter information having the recovered numeric value, as the latest first or second force parameter information.

13. The gaming system according to claim 8, wherein
in the first information recording part of the first card, the first game progression information is recorded, the first game progression information including invalidity information indicating that at least part of the first game progression information cannot be transmitted, as the information associated with the identifying information on the finger motion pattern for input; and
when the second controller acquires the invalidity information from the first gaming device, the second controller allows the second indicator to indicate that the at least part of the first game progression information cannot be transmitted.

14. A gaming device to progress a predetermined game through transmission and reception of game progression information to and from another gaming device, the gaming device comprising:
a card holder to hold a card such that an image of a finger motion pattern for input or an image corresponding to the finger motion pattern for input on the card, which image is printed on the card, is visible on the card holder;
a reader to read, from a stealth code printed on the card held in the card holder, the game progression information of the card, the game progression information including information inherent in the card, indentifying information on the finger motion pattern for input, and information associated with the identifying information on the finger motion pattern for input;
a storage unit to store a game progression program that allows the progress of the game;
a communicating unit to communicate with the another gaming device;
a touch sensor to detect an actual finger motion pattern; and a controller to allow the storage unit to store the game progression information read by the reader, to identify the actual finger motion pattern detected by the touch sensor, to allow at least part of the game progression information to be transmitted to the another gaming device through the communicating unit when the actual finger motion pattern coincides with the finger motion pattern for input in the game progression information stored in the storage unit, the at least part of the game progression information being used for the progress of the game in the another gaming device, to acquire the game progression information of the another gaming device through the communicating unit, and to allow the progress of the game using the acquired information.

* * * * *